US009152395B2

(12) United States Patent
Luengen et al.

(10) Patent No.: US 9,152,395 B2
(45) Date of Patent: Oct. 6, 2015

(54) RESPONSE TO USER INPUT BASED ON DECLARATIVE MAPPINGS

(75) Inventors: Ross Luengen, Sammamish, WA (US); Song Zou, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 345 days.

(21) Appl. No.: 12/966,842

(22) Filed: Dec. 13, 2010

(65) Prior Publication Data

US 2012/0147031 A1 Jun. 14, 2012

(51) Int. Cl.
*G06F 9/44* (2006.01)
*G06F 3/048* (2013.01)

(52) U.S. Cl.
CPC .. *G06F 8/38* (2013.01); *G06F 3/048* (2013.01)

(58) Field of Classification Search
CPC ........... G06T 11/60; G06T 11/00; G06T 3/40; G06T 3/4023; G06T 11/4007; G09G 5/346; G09G 5/391; G06F 3/0481; G06F 3/04842; G06F 3/04845; G06F 3/60; G06F 3/044; G06F 3/04883; G06F 3/0488; G06F 3/017; G06F 3/04886; G06F 3/048; G06F 15/16; H04L 29/06; H04L 29/08072; H04L 29/08756
USPC ................. 345/619, 647, 649, 654, 660, 665, 345/668–672, 684, 173; 715/863, 773; 709/246
See application file for complete search history.

(56) References Cited

U.S. PATENT DOCUMENTS

| | | | |
|---|---|---|---|
| 6,175,864 B1 | 1/2001 | Addison et al. | |
| 7,126,606 B2 | 10/2006 | Beda | |
| 7,336,280 B2 | 2/2008 | Nelson | |
| 2002/0101448 A1 | 8/2002 | Sanderson | |
| 2005/0086382 A1* | 4/2005 | Ramaswamy et al. | 709/246 |
| 2005/0278650 A1 | 12/2005 | Sims et al. | |
| 2006/0161871 A1* | 7/2006 | Hotelling et al. | 715/863 |
| 2010/0103117 A1 | 4/2010 | Townsend et al. | |
| 2011/0302267 A1* | 12/2011 | Christensen | 709/217 |
| 2011/0302519 A1* | 12/2011 | Fleizach et al. | 715/863 |
| 2011/0310126 A1* | 12/2011 | Georgiev et al. | 345/660 |
| 2012/0092340 A1* | 4/2012 | Sarnoff et al. | 345/672 |
| 2012/0236026 A1* | 9/2012 | Hinckley et al. | 345/629 |
| 2012/0257072 A1* | 10/2012 | Jirman | 345/619 |

FOREIGN PATENT DOCUMENTS

CN 1809068 A 7/2006

OTHER PUBLICATIONS

Declarative Language Design for Interactive Visualization—Published Date: Oct. 24, 2010 http://vis.stanford.edu/files/2010-Protovis-InfoVis.pdf.
Touch and Response—Published Date: Sep. 2010 http://msdn.microsoft.com/en-us/magazine/ff955609.aspx.

(Continued)

*Primary Examiner* — Chante Harrison
(74) *Attorney, Agent, or Firm* — Aneesh Mehta; Kate Drakos; Micky Minhas

(57) ABSTRACT

Systems and methods are provided that enable direct response to user input, e.g., in accordance with storyboards. For instance, applications can predefine storyboards which describe output in terms of received input. The predefined storyboards can be used externally and independently from the applications to process user input on behalf of the applications.

15 Claims, 13 Drawing Sheets

(56) References Cited

OTHER PUBLICATIONS

Windows Presentation Foundation—Retrieved Date: Sep. 27, 2010 http://en.wikipedia.org/wiki/Windows_Presentation_Foundation.
Chinese Office Action mailed Jan. 6, 2014 in CN Pat. App. No. 201110414197.X; 10 pages including Concise Explanation of Relevance and/or partial translation of Office Action.

"Third Office Action and Search Report Issued in Chinese Patent Application No. 201110414197.X", Mailed Date: Mar. 25, 2015, 11 Pages.

"Office Action Received for Chinese Patent Application No. 201110414197.X", Mailed Date: Sep. 16, 2014, 9 Pages.

* cited by examiner

RESPONSE TO USER INPUT BASED ON DECLARATIVE MAPPINGS

TECHNICAL FIELD

The subject disclosure relates to responding to user input on behalf of application(s) based on declarative mapping(s) of input to output pre-defined by the application(s).

BACKGROUND

Computer software typically responds to user input within a wide range of potential responses. For instance, one reaction to user input, for example, mouse input, or other input from a pointing device, can be to update a location of a cursor on a display screen. Other responses to user input can involve more extensive tasks, such as retrieval or generation of new content to be displayed on the display screen. In yet another example, an application can respond to user input with complex manipulations and/or transforms on displayed content which has been previously generated.

With the rapid proliferation of touch input technology, e.g., touch screens, multi-touch displays, etc., computer software is exposed to ever increasing variance in user input type. By way of example, touch input can involve various finger and hand manipulations such as swipes, pinches, taps, persistent contacts, etc. Such touch input can generate an influx of complex input for applications to respond to at a given time.

Typically, user input is processed, from user action to application response, according to the following procedure. User actions are captured as user input via input devices, e.g., keyboards, mice, styluses, touch screens, etc. The input devices, and associated hardware, transform the user actions into signals received by an operating system. The operating system can process the signals, identify an application or applications associated with the user input, and send one or more messages to the application(s) via system application program interfaces (APIs), system libraries, application frameworks, or the like. The application(s) apply application logic to generate an appropriate response, which traverse back through the operating system to output hardware that expresses the response to the user. The aforementioned process can introduce additional processing time, which can negatively impact application responsiveness, particularly with increasingly complex input types like touch input. Further, the additional processing time introduces visible effects, particularly with touch input. For instance, with touch input, a user can directly relate a finger position with a response on a screen.

The above-described deficiencies of today's input processing and response systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one embodiment, an application can provide one or more storyboards which define full output for particular input in advance. Storyboards can describe output in terms of received input, such that appropriate output can be generated according to obtained user input. Storyboards enable fast feedback and response to user input since the user input can be handled independently from the application. For instance, in one embodiment, an operating system can employ storyboards to respond to user input on behalf of the application to increase performance of the application and to universalize interaction response to all applications running on the operating system.

In another embodiment, an output transformation, in response to a touch manipulation, can be described as a storyboard to enable direct response to touch input. Touch input can include touch manipulations in which a user directly manipulates an object on a display screen via gestures of the user's fingers and hands. With storyboards, various manipulation types, e.g., strokes, drags, flicks, pinches, multi-point gestures, etc., can be declaratively mapped, ahead of time, to various output transforms, e.g., zoom, pan, translation, skew, rotate, scale, or the like, which can be performed independently of the application.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
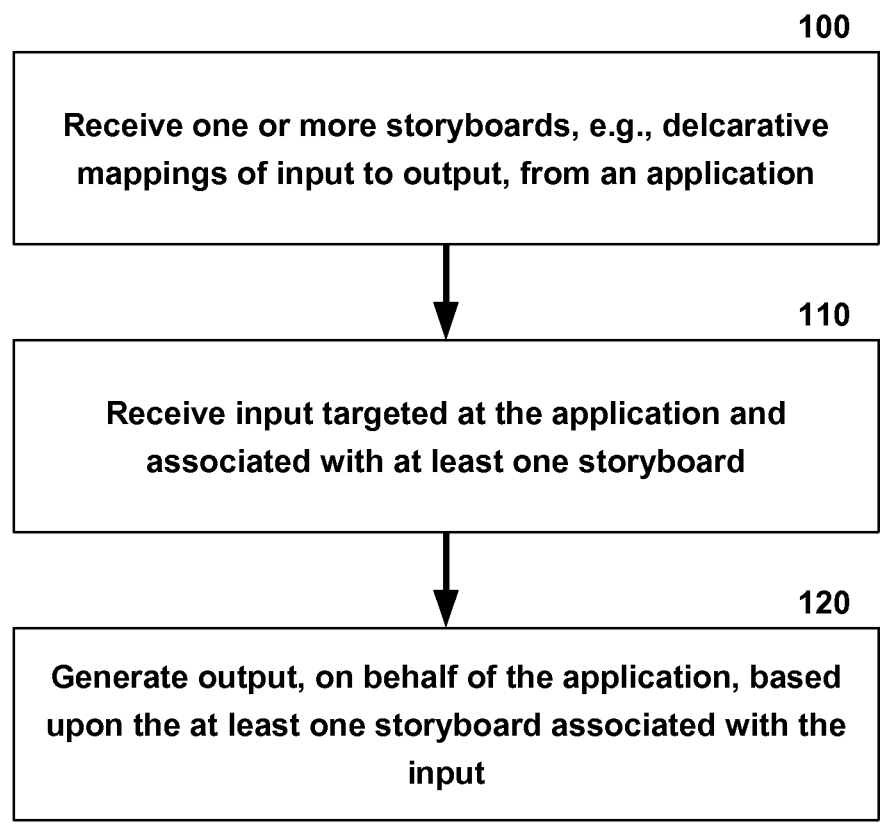
FIG. 1 is a flow diagram illustrating an exemplary, non-limiting embodiment for bypassing input processing of an application and responding to user input on behalf of the application.

As discussed in the background, latency between user input and application output can result in an application that appears unresponsive or sluggish. For instance, time passage between when user input is obtained by hardware to when output is displayed on a display screen can range from tens of milliseconds to hundreds of milliseconds. This delay can become more noticeable to a user when the application is distracted performing time consuming tasks, e.g., I/O to disk, complex math operations, etc., while user input queues.

Moreover, certain classes of user input are more susceptible to latency issues than others. In an example, with touch input, the latency described above can be readily observed by a user, thus making applications appear unresponsive and slow. Conventional techniques to improve application responsiveness despite input latency include employing multiple threads to distribute and separate tasks of the application. For instance, an application can include an input thread and a rendering thread. The input thread obtains user input messages from a lower level, e.g., application framework or operating system, and can implement a queue. The input thread periodically marshals obtained user input to the rendering thread which performs rendering and layout of output based upon the user input. Separate input and rendering threads enable an application to remain responsive to user input, e.g., continuously receive user input during backend processing without blocking incoming user input. However, output displayed to the user can still be subject to noticeable latency while the application carries out rendering and layout functions. Accordingly, conventional techniques to create responsive applications cannot provide rapid output of application responses to user input.

In various, non-limiting embodiments, applications can predefine application behavior to user input. For instance, applications can provide storyboards or declarative mappings of input to output. The storyboards or declarative mappings specify robust descriptions of output for a given input. Storyboards can be defined for particular objects of an application, e.g., objects or content rendered as part of a user interface of the application. In addition, storyboards can be associated with regions of the application user interface such that output for the region is described for particular input irrespective of a visual content in the region.

According to further embodiments, a component external to applications can utilize provided storyboards or declarative mappings to generate application responses on behalf of the applications. In this regard, applications can focus on backend processing, content generation, etc., while the external component maintains a responsive user interface with immediate visual results. Accordingly, the external component enables application input processing to be bypassed to reduce latency associated with layout and re-rendering of a graphical user interface.

In one embodiment, a method is described herein that includes receiving, from an application, a set of declarative mappings describing output based upon input, receiving user input directed to the application, and generating output, on behalf of the application, in response to the user input based on at least one declarative mapping from the set of declarative mappings. In an example, receiving the user input can include receiving a touch manipulation via a touch interface and determining whether the touch manipulation is associated with a declarative mapping in the set of declarative mappings. Further, the method can also include forwarding the user input to the application in response to the user input not being associated with the set of declarative mappings.

According to further embodiments, generating the output can include identifying an input manipulation represented by the user input and selecting, from the set of declarative mappings, at least one declarative mapping that is associated with the input manipulation. Moreover, the method can include determining a set of values associated with the input manipulation based on the user input, determining, based on the at least one declarative mapping, a set of output parameters for the set of values associated with the input manipulation, and generating an output transform based on the set of output parameters including generating a manipulation on at least one of a region or an object of the application. Further, the method can include transmitting the output to a graphics subsystem, e.g., a graphics processing unit (GPU), configured to display the output on a display screen.

In another embodiment, a direct manipulation subsystem, integrated into an operating system, can include an input component configured to receive at least one declarative mapping from at least one application and user input corresponding to at least one touch manipulation of a touch interface, and an output transform component configured to create at least one output transform based upon the at least one declarative mapping, wherein the at least one output transform represents at least one response to the user input. The subsystem can further include an input evaluation component configured to determine that the user input corresponds to a touch manipulation for which a declarative mapping of the at least one declarative mapping has been received, a manipulation analysis component configured to identify a set of values associated with the user input, and a parameter determination component configured to derive at least one output parameter of the at least one output transform, and, based on the at least one declarative mapping, obtain a set of output parameters corresponding to the set of values associated with the user input. According to an example, the at least one declarative mapping includes a plurality of functions that map a set of input parameters of the user input to a set of output parameters specifying an output for a response to the user input. In another example, the output transform component generates the output transform independently of the application to which the user input is directed.

In an additional embodiment, a system is described that includes a direct manipulation component configured to receive a set of declarative mappings from an application and touch input for the application from an operating system of the system, wherein the direct manipulation component derives output that responds to the touch input, independently and on behalf of the application, in accordance with the set of declarative mappings. According to some examples, the set of declarative mappings is associated with a type of touch manipulation, or the set of declarative mappings is associated with a region of a display to which the application renders application content. In a further example, the direction manipulation component is configured to apply the output to the application content to a display space region associated with the set of declarative mappings. Moreover, the direction manipulation component is configured to provide the output to the operating system to instruct a graphics processing unit to apply an output transform specified in the output. In addition, the set of declaration mappings includes respective declarative mappings for a set of characteristics of the touch input.

Herein, an overview of some of the embodiments for providing direct responses to user input on behalf of applications in accordance with predefined declarative mappings of input to output has been presented above. As a roadmap for what follows next, various exemplary, non-limiting embodiments and features for direct manipulation of objects or regions of a graphical user interface are described in more detail. Then, some non-limiting implementations and examples are given for additional illustration, followed by representative network and computing environments in which such embodiments and/or features can be implemented.

Direct Input Response Based Upon Predefined Declarative Mappings of Input to Output As mentioned above, in various embodiments, an application can provide one or more storyboards which define full output for particular input ahead of time. The storyboards describe output in terms of received input, such that appropriate output can be generated according to obtained user input. The storyboards enable immediate feedback and response to user input as the user input can be handled independently from the application. For instance, in one embodiment, an operating system can employ the storyboards to respond to user input on behalf of the application to increase performance of the application and to universalize interaction response to all applications running on the operating system.

In a specific, non-limiting example, touch input can include touch manipulations in which a user can directly manipulate an object on a display screen via gestures of the user's fingers and hands. For instance, the user can place a finger on the display screen at a location where an object of an application is displayed. While maintaining contact with the display screen, the user can slide his or her finger along the display screen in any direction with the expectation that some transform will be performed on the underlying object. Typically, each application holds the responsibility to form output transformations on an object in response to received touch manipulations, which can result in diverse response times and behaviors across disparate applications. In one embodiment, the output transformation, for a manipulation type, can be described as a storyboard to enable direct responses to touch manipulations. For example, various manipulation types, e.g., strokes, drags, flicks, pinches, multi-point gestures, etc., can be declaratively mapped, ahead of time, to various output transforms, e.g., zoom, pan, translation, skew, rotate, scale, or the like.

Moreover, it will be appreciated that storyboards can be employed to provide pre-defined responses to other input types beyond touch. For instance, keyboard input, mouse input, etc., can be defined by storyboards. Further, it will be appreciated that described behaviors can extend beyond manipulations of objects on a display screen. As an example, storyboards can describe complex responses such as deletions, file save, file open, minimizations, maximizations, or substantially any other application behavior.

With respect to one or more non-limiting ways to declare possible output independently from a response of an application as described above, FIG. 1 shows a flow diagram illustrating an exemplary, non-limiting embodiment for bypassing input processing of an application and responding to user input on behalf of the application. At 100, one or more storyboards, e.g., declarative mappings of input to output, can be received from an application. The storyboards can be related to particular objects on or regions of a display screen displaying a graphical user interface of the application. For a particular object or region on the display screen, one or more storyboards can be predefined by the application to describe an output transformation or output operation to be performed on the object or region in response to user input. In a specific, non-limiting example, a storyboard of an object can relate, e.g., map, a parameter or characteristic of the user input to a response, e.g., change or transform, in a variable, characteristic, or parameter of the object. For instance, a storyboard can map a length of a drag input, in an x-direction, to an amount of object translation in the x-direction according to a predetermined ratio, e.g., 1:1, 2:1, 10:1, etc.

At 110, user input, intended for the application, can be received. The user input can be associated with at least one storyboard predefined by the application and obtained from the application. At 120, output is generated on behalf of the application. In one embodiment, the output is generated based upon the at least one storyboard predefined by the application for the received user input.

In a non-limiting example, the received user input can be targeted at, directed to or otherwise associated with an object of the application displayed on a display screen. For instance, the object can be a graphic or image and the user input can relate to a move operation on the graphic. One or more storyboards, associated with the object and move operations on the object, can be leveraged to generate the output. One storyboard can map a magnitude of the move operation in an x-direction with an amount of translation of the object in the x-direction. Accordingly, for that storyboard, the user input can be analyzed to determine the magnitude of the move operation in the x-direction and the amount of translation, in the x-direction, can be computed based upon the storyboard. Similarly, another storyboard, associated with the object and move operation, can provide a function from a y-direction component of the move operation to an amount of translation of the object in the y-direction. With translation in the x-direction and translation in the y-direction determined via storyboards, the output, e.g., overall translation of the object, can be generated and displayed.

According to an embodiment, the storyboards can be leveraged independently from the application to handle user input on behalf of the application. For instance, the operating system can utilize storyboards to directly manipulate application objects, e.g., update the visual output of the application, in response to user input to increase a speed at which responses are perceived by a user. While storyboards can map characteristics of input from keyboards, mice, etc., to parameters with which to update visual output of an application, it is to be appreciated that storyboards for touch input provide additional benefits. As described above, the time between a user action, e.g., user input, and a response, e.g., visual output, from an application can range from tens of milliseconds to hundreds of milliseconds. For touch-based input, this delay introduces noticeable effects on the visual output of the application.

Figure 2:
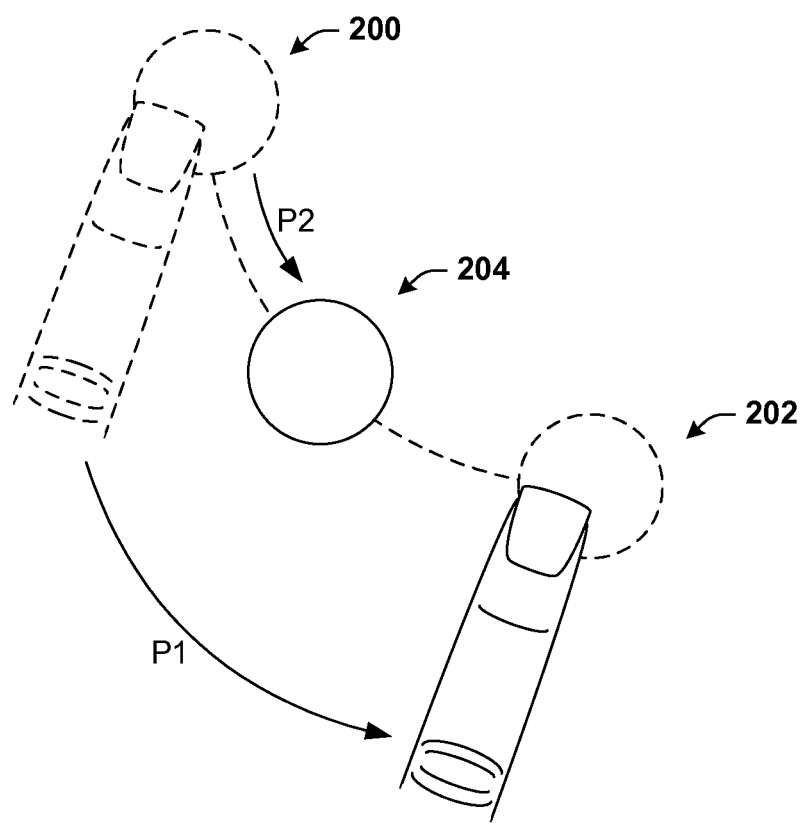
FIG. 2 is an exemplary, non-limiting illustration of conventional touch input and visual response according to one or more aspects.

By way of example, FIG. 2 is an exemplary, non-limiting illustration of conventional touch input and visual response. An object on a display screen can be initially located at position 200, as illustrated in FIG. 2. A user, with a finger, stylus, or other pointing tool, can touch the object with the intent to move the object to a new location other than position 200. For instance, the user, with a finger, can trace, while maintaining contact with the display screen, a path for the object to move along, wherein the path is parallel to path P1. The user can stop the path trace at position 202, which represents a final location of the object desired by the user. While the user makes the motion with the finger from position 200 to position 202, corresponding user input signals are transmitted to the application. As the user input signals are received, the application can commence input processing to ultimately generate visual output depicting the object traversing along path P1 traced by the user.

However, as described above, application input processing has some inherent latency. This latency can manifest visually to the user as illustrated in FIG. 2. Particularly, when the finger, tracing path P1, stops at position 202, the object traversing path P2 reaches position 204, located between position 200 (the initial location) and position 202 (the final location).

Figure 3:
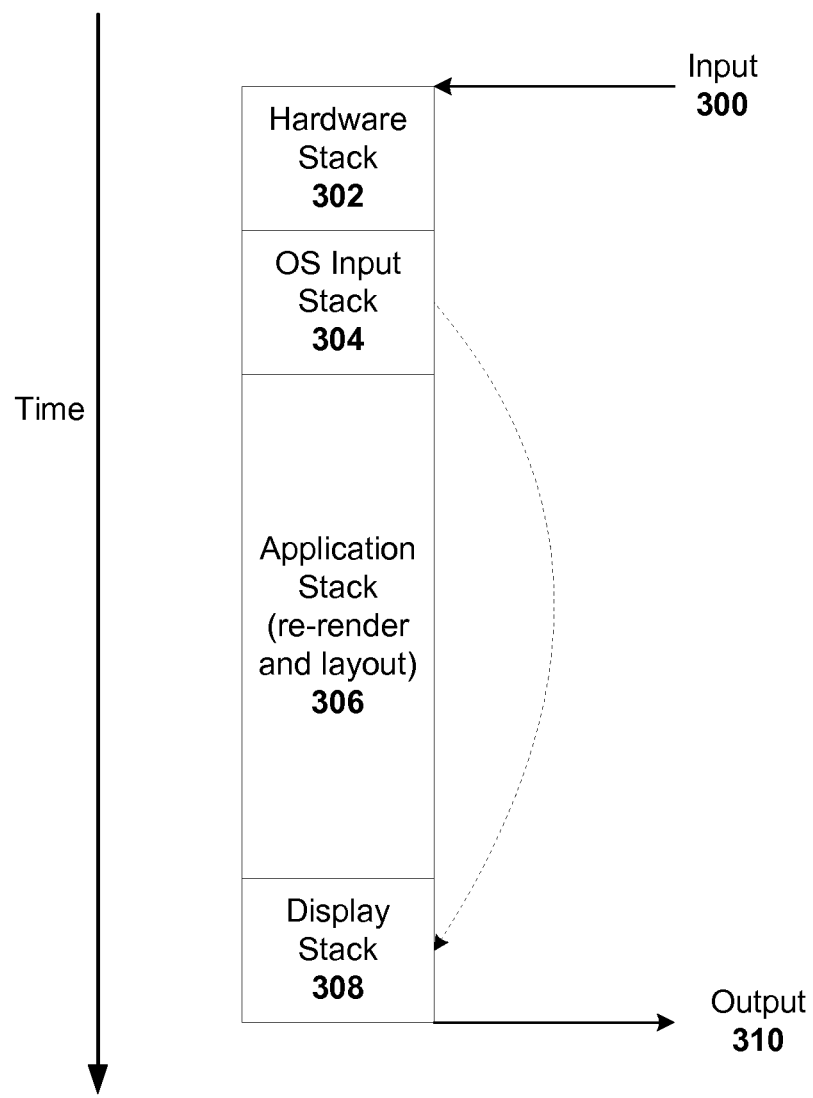
FIG. 3 is an exemplary, non-limiting illustration of a conventional input flow through an input stack in accordance with one or more embodiments.

Turning to FIG. 3, an exemplary, non-limiting illustration of a conventional input flow through an input stack in accordance with one or more embodiments is shown. Input 300 can occur when a user interacts with input hardware such as a touch screen, keyboard, mouse, etc. Input 300 is captured, via input devices, by hardware stack 302. Hardware stack 302 can convert user actions on input devices into electronic signals. Operating system (OS) input stack 304 can obtain the electronic signals and transform the electronic signals into software messages. OS input stack 304 can send the software messages to an appropriate application. For instance, OS input stack 304 can identify the application having focus and emit an event or interrupt to notify the application with focus of input 300.

Application stack 306 receives the software messages, representing input 300, from OS input stack 304. Application stack 306 includes functions and subroutines to process and respond to input 300. For instance, application stack 306 can include logic to layout and re-render a graphical user interface and/or content displayed in the graphical user interface in response to input 300. Application stack 306 generates visual output based upon input 300, which is displayed on a display screen as output 310 via display stack 308. Display stack 308 can include functionality of the OS, e.g., video drivers, graphics libraries, etc., and display hardware, e.g., graphics device, display screen, etc.

As described previously, the time from when input 300 is captured by hardware stack 302 to when output 310 is displayed on a display screen introduces latency which can be perceived by a user. In particular, in the case of touch input, delay from input to output of several hundreds of milliseconds can produce noticeable lag in an application. While such delay can be present in other types of input, e.g., keyboard input, mouse input, etc., the delay in such cases is not as prevalent as with touch input. For instance, with touch input, a user simultaneously perceives the user action producing the user input, such as a gesture on a touch screen, and the visual output of the application in response to the user input. Further, the user action is controlled based upon the user's perception of the action itself. With other input types, such as mouse input, the user typically perceives results of the input generating action, e.g., movement of a cursor, rather than the action itself. By way of example, the user typically does not control user action based upon how far the mouse device is moved, but, rather, based on the motion of the cursor. Accordingly, with non-touch input, users react to and perceive a visual response to the input, which is post latency. With touch input, users react to and perceive the input itself and not the visual response. As such, the phenomenon illustrated in FIG. 2 becomes more prevalent.

According to an embodiment, the application associated with application stack 306 can describe characteristics of output 310 based upon parameters of input 300 to generate a storyboard or declarative mapping of input to output. With the declarative mapping, input flow can bypass application stack 306 and proceed along the dashed line shown in FIG. 3 from OS input stack 304 to display stack 308. For instance, OS input stack 304 can create output 310 from input 300 based upon the storyboard. The output created by OS input stack 304 can be directly displayed on the display screen as output 310 without intervention by the application. Thus, by skipping application stack 306, input processing is expedited and the visual output lag described above is reduced.

Figure 4:
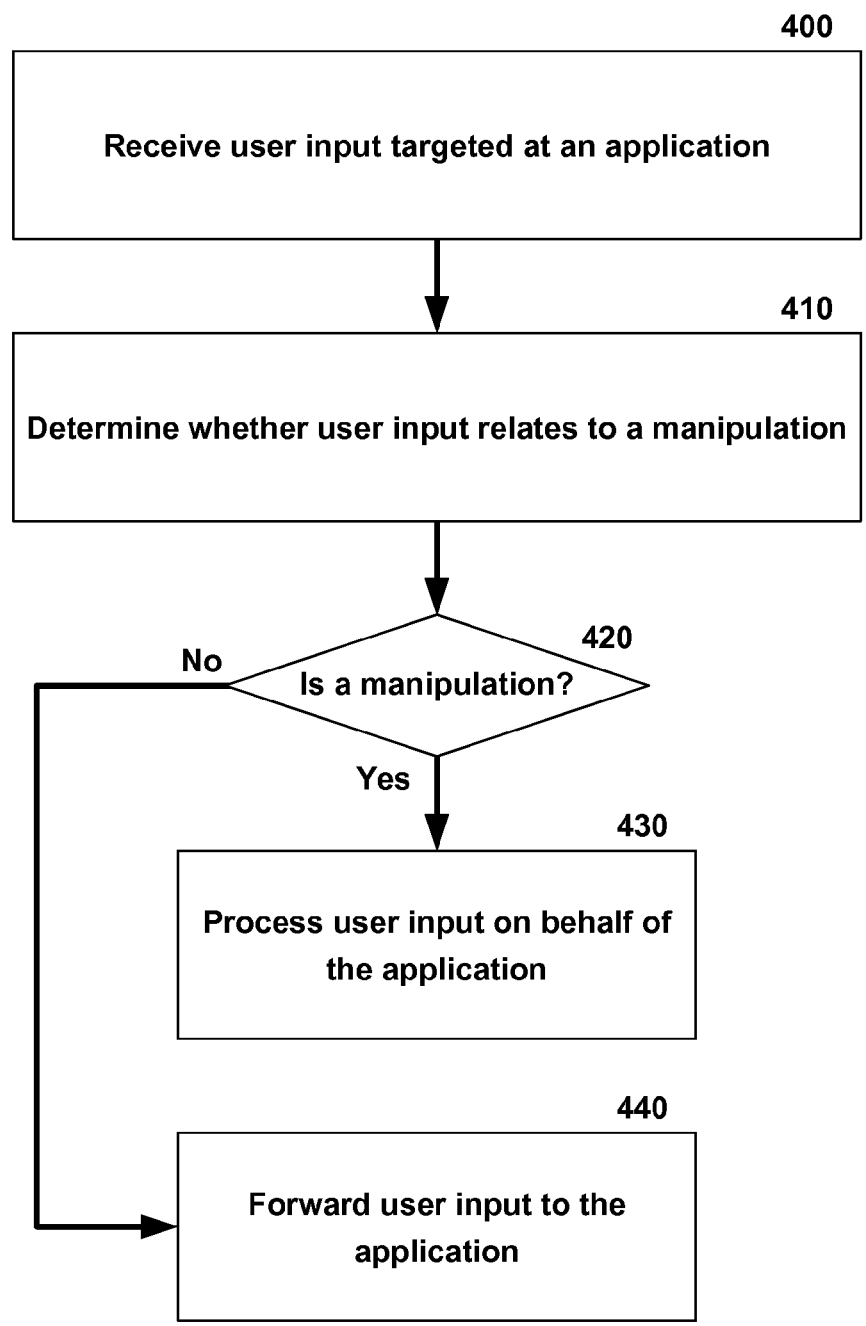
FIG. 4 is a flow diagram illustrating an exemplary, non-limiting embodiment for handling user input corresponding to predefined manipulations.

FIG. 4 shows a flow diagram illustrating an exemplary, non-limiting embodiment for handling user input corresponding to predefined manipulations. At 400, user input targeted at an application is received. In a specific, non-limiting example, the user input is touch input generated as a result of user interaction with a touch screen display or other touch-based interface. At 410, it is determined whether the user input relates to a manipulation. For instance, raw user input can be monitored and sampled to identify whether the raw user input corresponds to a manipulation which has be described in a storyboard. Through monitoring, short user actions, such as taps, can be distinguished from longer user actions, such as swipes. At 420, it is determined whether the manipulation identified at 410 is a manipulation for which a storyboard has been provided. If the manipulation corresponds to a storyboard, the user input, e.g. manipulation, is processed, at 430, on behalf of the application, based upon the storyboard. If the manipulation does not correspond to a storyboard, the user input can be forwarded to the application as non-declared input at 440.

Figure 5:
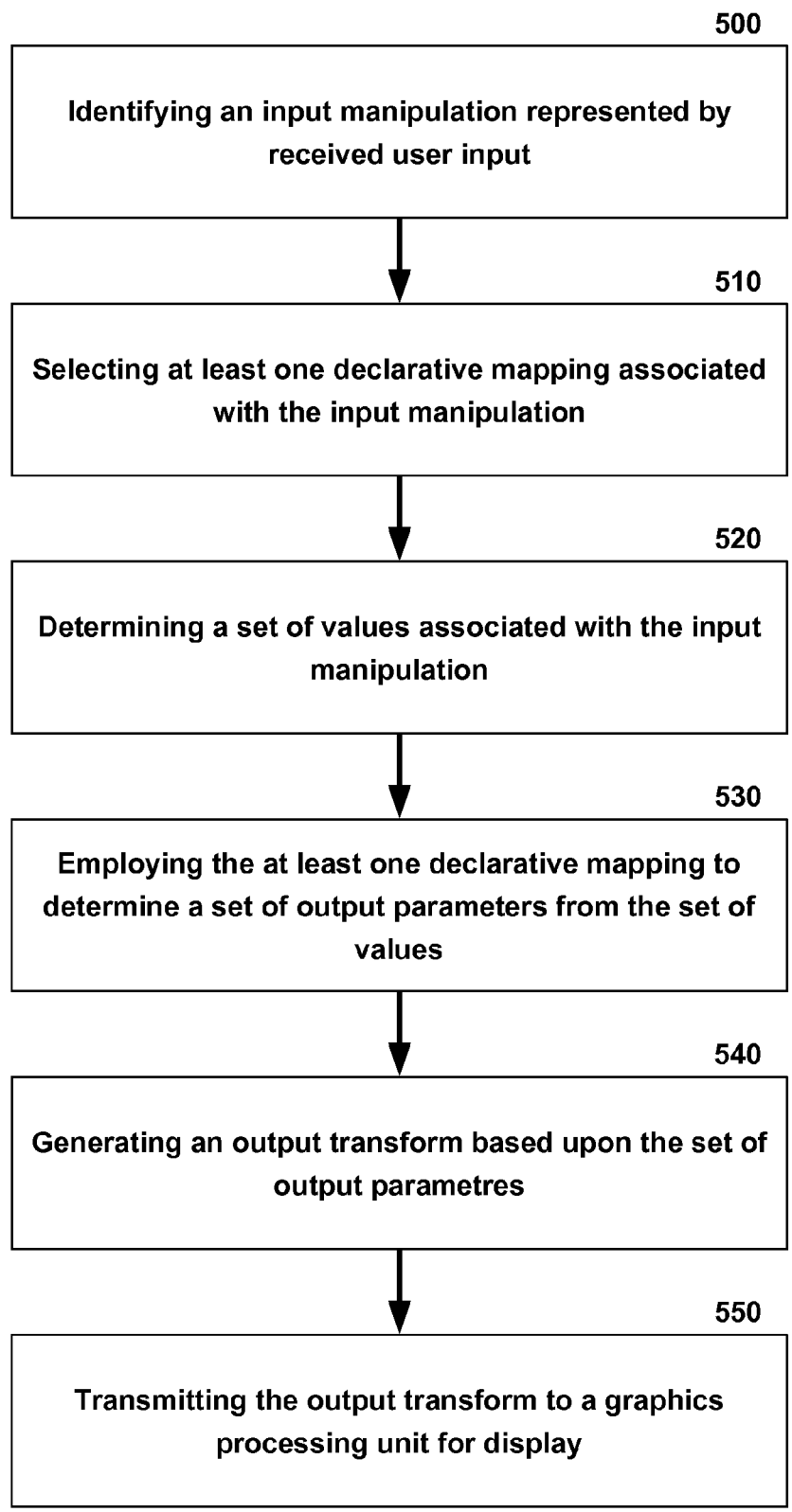
FIG. 5 is a flow diagram illustrating an exemplary, non-limiting embodiment for responding to user input in a manner predefined by an application.

FIG. 5 shows a flow diagram illustrating an exemplary, non-limiting embodiment for responding to user input in a manner predefined by an application. At 500, an input manipulation represented. At 510, at least one declarative mapping associated with the identified input manipulation is selected. At 520, a set of values associated with the input manipulation is determined. At 530, the at least one declarative mapping selected is employed to determine a set of output parameters from the set of values of the input manipulation. At 540, an output transform is generated based upon the set of output parameters. At 550, the output transform is transmitted to a graphics processing unit configured to perform the transform and display a result.

Figure 6:
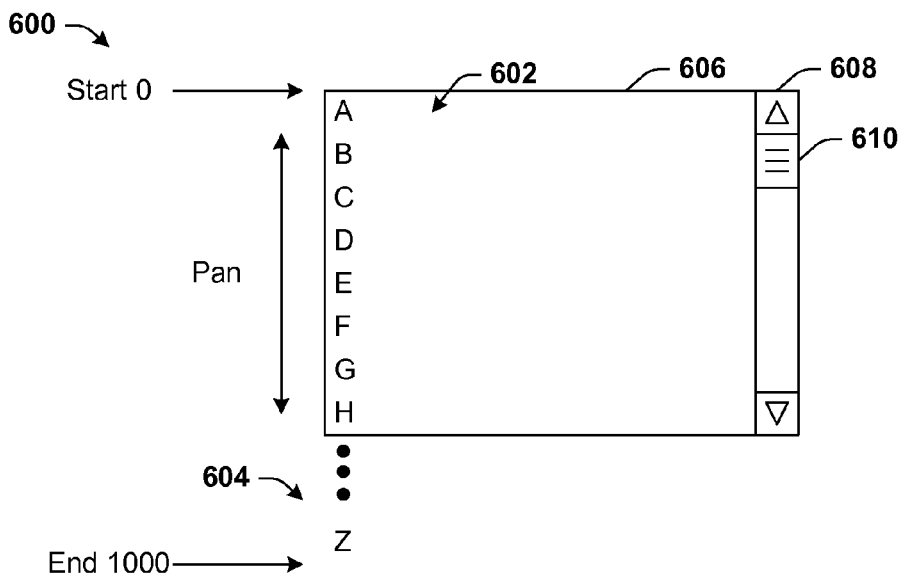
FIG. 6 is an exemplary, non-limiting illustration of a panning manipulation expressed as a storyboard in accordance with one or more embodiments.
Figure 6:
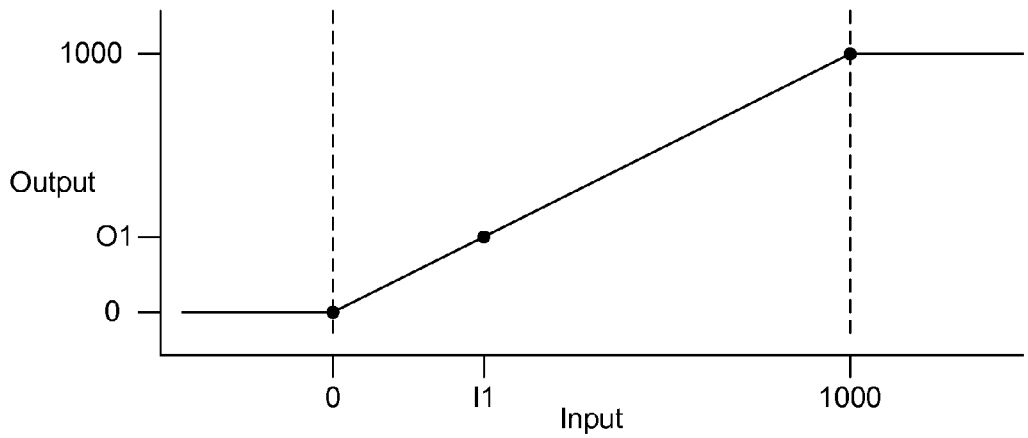
Figure 6:
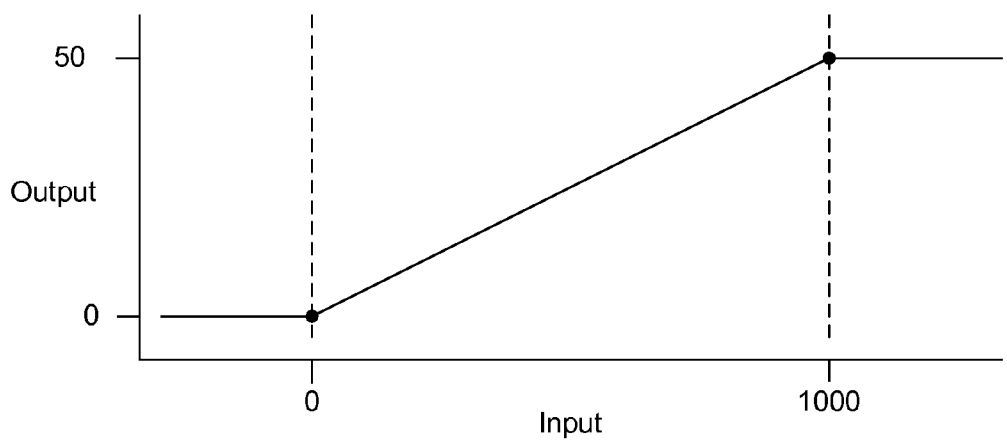

Referring to FIG. 6, an exemplary, non-limiting illustration of a panning manipulation expressed as a storyboard in accordance with one or more embodiments is depicted. As shown in FIG. 6, a scrollable list 600 can be included in an application and responsive to one or more gestures, such as a vertical panning manipulation. In an example, a vertical panning manipulation can involve a user placing a finger on a touch interface at a position occupied by scrollable list 600 and, while maintaining contact, slide the finger upwards and/or downwards.

Scrollable list 600, according to the example shown in FIG. 6, can include a list of 1000 items starting from index 0 and ending at index 1000. The entirety of the items may not be visible at one time. For instance, scrollable list 600 can include a visible part 602 and a hidden part 604. Visible part 602 can be a portion of scrollable list 600 contained with viewport 606, which can represent a bounded region that contains scrollable list 600. In an example, viewport 606 can be a window of the application on the display screen or a region within the window of the application. Also shown in FIG. 6, is a scroll bar 608 with a scroll indicator 610. The scroll indicator 610 has a predetermined size such that scroll indicator 610 is located at a top of scroll bar 608 when scrollable list 600 displays index 0 at a top of viewport 606 to indicate that scrollable list 600 has been scrolled all the way to the top. Similarly, the scroll indicator 610 can be located at a bottom of scroll bar 608 when scrollable list 600 display index 1000 at a bottom of viewport 606 to indicate that scrollable list 600 has been scrolled all the way to the bottom.

Conventionally, in response to a vertical pan manipulation, for example, in a downward direction, the application associated with scrollable list 600 would acquire content from hidden part 604. An amount of hidden part 604, or number of pixels of the content in hidden part 605, can depend upon a magnitude of the pan manipulation. For instance, the magnitude of the panning manipulation can correspond to a size of one item and operate to pan scrollable list 600 by a distance of one item. Accordingly, the application brings in item I and renders item I at a bottom of viewport 606 at a location previously occupied by item H. Item B through item H are re-rendered at new locations respectively one location higher. Item A, accordingly, falls outside of viewport 606 and visible portion 602 and is not re-rendered.

In an embodiment, storyboards enable scrollable list 600 to be manipulated in response to the vertical pan manipulation independently of the application associated with the list. In other words, storyboards enable direct manipulation of scrollable list 600, thus bypassing the input processing of the application. In FIG. 6, an exemplary, non-limiting storyboard 612 associated with scrollable list 600 is illustrated in a graphical representation. Storyboard 612 relates input to output as shown. In particular, storyboard 612 maps a parameter, variable or characteristic of input, e.g., in this case a vertical panning manipulation, to a parameter, variable, or characteristic of desired output, e.g., scrolling the list.

Storyboards, like storyboard 612, can be define input and output (or characteristics thereof) with arbitrary units. In other words, the units employed in storyboards can be chosen to best describe output behavior in response to a particular manipulation. For instance, storyboard 612 can describe input and output in terms of items of scrollable list 600. Storyboard 612, in this example, would relate a length, in number of items, of the vertical panning manipulation, in a y-direction, to a number of items by which scrollable list 600 should be scrolled.

In yet another embodiment, storyboard 612 can specify a state of scrollable list 600. For example, a value on the input axis of storyboard 612 can indicate a current scroll location of scrollable list 612. For instance, value 0 of the input axis indicates that index 0 of scrollable list 600 (e.g., item A) is at a top most point (or at some other pre-determined reference point) in visible part 602. Similarly, output axis can indicate an output state of scrollable list 600.

By way of illustration, an initial state of scrollable list 600 can correspond to value 0 on the input axis of storyboard 612 (e.g., index 0 (item A) at the reference point). A vertical panning manipulation on scrollable list 600 can be received having a magnitude, in number of items, of I1. Accordingly, the user input corresponds to a transition from value 0 to value I1 on the input axis of storyboard 612. Utilizing storyboard 612, an appropriate visual output can be generated based upon the input. For instance, a scroll or pan of scrollable list 600 can occur from an initial state having a value of 0 to a final state having a value of O1. In other words, scrollable list 600 can be scrolled such that the item at index O1 of the list occupies the reference point instead of the item at index 0.

As shown in FIG. 6, output is generated only for input within boundaries defined by storyboard 612. For example, when item A (index 0) is at a top-most position of visible part 602, scrollable list 600 is considered to be scrolled to the top. Accordingly, as indicated in storyboard 612, when user input, e.g., a vertical pan manipulation, in an upwards direction is received; scrollable list 600 is not altered as the list is already scrolled to the top. In another example, scrollable list 600 is not scrolled further downwards, in response to downward directing vertical pan input, when item Z (index 1000) is at a bottom-most position of visible part 602. However, at locations between the aforementioned boundaries, scrollable list 600 can be scrolled in response to obtained input according to the relationship described in storyboard 612. In the specific, non-limiting example of storyboard 612, scrollable list 600 is linearly scrolled in response to input according to a 1:1 ratio. However, it will be appreciated that other relationships between input and output, besides linear transforms, can be defined to describe panning operations. For instance, scrolling output can be parabolically related to input such that a perceived scrolling speed increases as a user pans further and further down scrollable list 600. In another example, the relationship can be largely linear but include non-linear portions, such as friction point. By way of illustration, a non-linear curve can transition from the horizontal portions of storyboard 612 to the linear portion of storyboard 612. The non-linear curves can be perceived by the user as friction or stickiness of scrolling, such that initiating a scroll from a top of scrollable list 600 commences slowly and increases up to a constant rate and, subsequently, begins to decelerate to a stop as an end of the scrollable list 600 approaches.

In another embodiment, received user input can be associated with multiple storyboards such that multiple transforms are output in response to the user input. For instance, storyboard 614, corresponding to scroll indicator 610, can be associated with the same vertical panning manipulation as storyboard 612 to translate scroll indicator 610 along scroll bar 608 as a user pans scrollable list 600. Storyboards 612 and 614 can be independently defined with disparate units and different relationships. As shown in FIG. 6, storyboard 614 includes different output units than storyboard 612. In the example illustrated in FIG. 6, storyboard 612 output is defined in terms of items in scrollable list 600. Storyboard 614, in contrast, can be defined as a number of pixels by which scroll indicator 610 should move from a top of scroll bar 608 to a bottom of scroll bar 608. By defining multiple storyboards for a given input, various output transforms on a plurality of objects can occur simultaneously, wherein the various output transforms can be defined in terms of disparate units, occur at different rates, etc.

Figure 7:
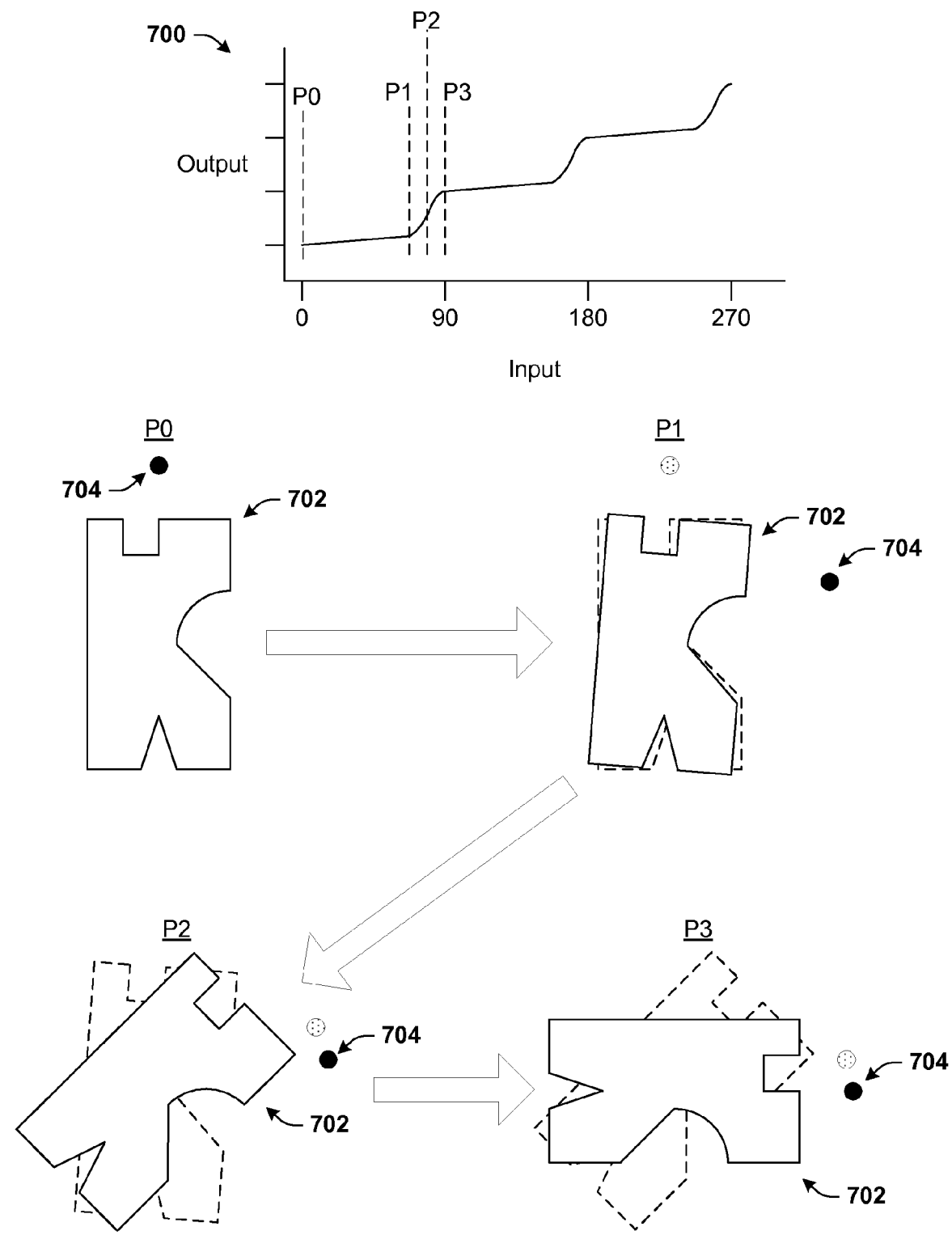
FIG. 7 is an exemplary, non-limiting illustration of a rotation manipulation expressed as a storyboard in accordance with one or more embodiments.

FIG. 7 shows an exemplary, non-limiting illustration of a rotation manipulation expressed as a storyboard in accordance with one or more embodiments. As shown in FIG. 7, a storyboard 700 fully describes output on an object in response to user input corresponding to a rotational manipulation. Storyboard 700 depicts a specific, non-limning example of a non-linear declarative mapping between input and output. It will be appreciated, however, that rotational manipulations can be fully described in storyboards with linear relationships.

Storyboard 700 illustrates how complex application behaviors can be modeled as declarative mappings such that the behaviors can be achieved independently of application response. For instance, storyboard 700 depicts how preferred object states, e.g., sticky points, can be communicated to a user. In the example shown in FIG. 7, preferred object states can be multiples of 90 degrees. Accordingly, during a rotation manipulation on an object, the object can visually appear to stick at the preferred object states. This behavior can become apparent as the object initially is reluctant to rotate for a portion of the rotation input before rapidly catching up and snapping to a next preferred object state.

FIG. 7 illustrates a visual output associated with an object 702 undergoing a rotational manipulation in accordance with storyboard 700. Particularly, a state of object 702 is illustrated at various points on storyboard 700 from an initial state of 0 degrees of rotation to a final state of 90 degrees of rotation. At P0, object 702 is in the initial state of 0 degrees of rotation. Associated with object 702 is a rotation handle 704 which can be manipulated by a user to perform a rotate operation on object 702. For instance, the user can touch rotation handle 704 and drag rotation handle 704 in an arc to the right to initiate a clockwise rotation of object 702.

At P1, rotation handle 704 has been moved approximately 67.5 degrees, clockwise, from the previous position shown at P0. According to storyboard 700, 67.5 degrees of input maps to a slight output rotation of object 702 as shown in FIG. 7. As the user continues to rotate object 702 and proceeds from P1 to P2, rotation handle 704 further moves a slight distance from the previous position at P1. At P2, rotation handle 704 is approximately 78.75 degrees clockwise from the initial position at P0. With the additional slight input between P1 and P2, object 702 is manipulated to depict a larger amount of rotation. For instance, with approximately 11.25 degrees of additional input, object 702, in accordance with storyboard 700, rotates to approximately 45 degrees from an initial state. As the user continues with the rotational manipulation and moves rotation handle 704 to a 90 degree position as shown in FIG. 7 corresponding to P3, object 702 is also rotated to 90 degrees.

It is to be appreciated that, in response to the rotational input, rotation handle 704 can be visually controlled in accordance with another storyboard (not shown). In an embodiment, the storyboard associated with rotation handle 704 can have a linear relationship between input and output such that rotation handle 704 accurately reflects an amount of rotation a user has applied, thus far, in the rotation manipulation. Moreover, storyboards associated with rotation handle 704 can specify a rotation point about which rotation handle 704 will rotate. In one example, the rotation point can correspond to a point of rotation of object 702 so that rotation handle 704 traces an arc around object 702 as shown in FIG. 7.

As shown in FIGS. 6 and 7, storyboards can be defined that map a variety of input characteristics to a variety of output characteristics. While FIGS. 6 and 7 illustrate a few examples, it is to be appreciated that storyboards can predefine output behavior in terms of a wide array of parameters. As non-limiting and non-exhaustive examples, storyboards can provide declarative mappings from an input manipulation having a set of input values, which can include horizontal pan, vertical pan, horizontal scaling, vertical scaling, center point of the scale transform, rotation angle, center point of rotation, horizontal skew, vertical skew, center point of skew, and the like. The storyboards, for each input value type, can describe a change to a parameter or characteristic of output. For instance, for a given manipulation, a storyboard can be defined which maps a value of horizontal pan of the manipulation to an amount of horizontal output translation to be applied on an object.

Moreover, the storyboards can define distinct output behavior in disparate input ranges. For instance, a vertically panning manipulation within a region with boundaries can be defined in a storyboard as having three transition points with respect to a vertical pan variable. In an example, the three transition points can separate an area below a panning boundary, an area within the panning boundary, and an area above the panning boundary. Above and below panning boundaries, the storyboard can define a constant value transition; where output movement stays constant relative to input. Within the panning boundaries the transition can be a linear value with a 1:1 slope. A storyboard defined in accordance with example, having the input variable as the vertical pan position, defines a region where panning responds directly to the touch input within the panning boundaries, then ceases to move once the boundary limitation has been reached. Similar movements can be used to control scaling and rotation. Additionally, storyboards can be used to control any independent variable from the set of input manipulations beyond manipulation output. For instance, object opacity can be transformed in response to input.

As described herein, declarative mappings of input to output as storyboards enables applications to shift responsibility for moving a region or object. Since storyboards provide a rich mechanism to define complex functions relative to input, rich interaction models become possible by defining a group of functions across parameters of input manipulations to an arbitrary number of output variables.

Figure 8:
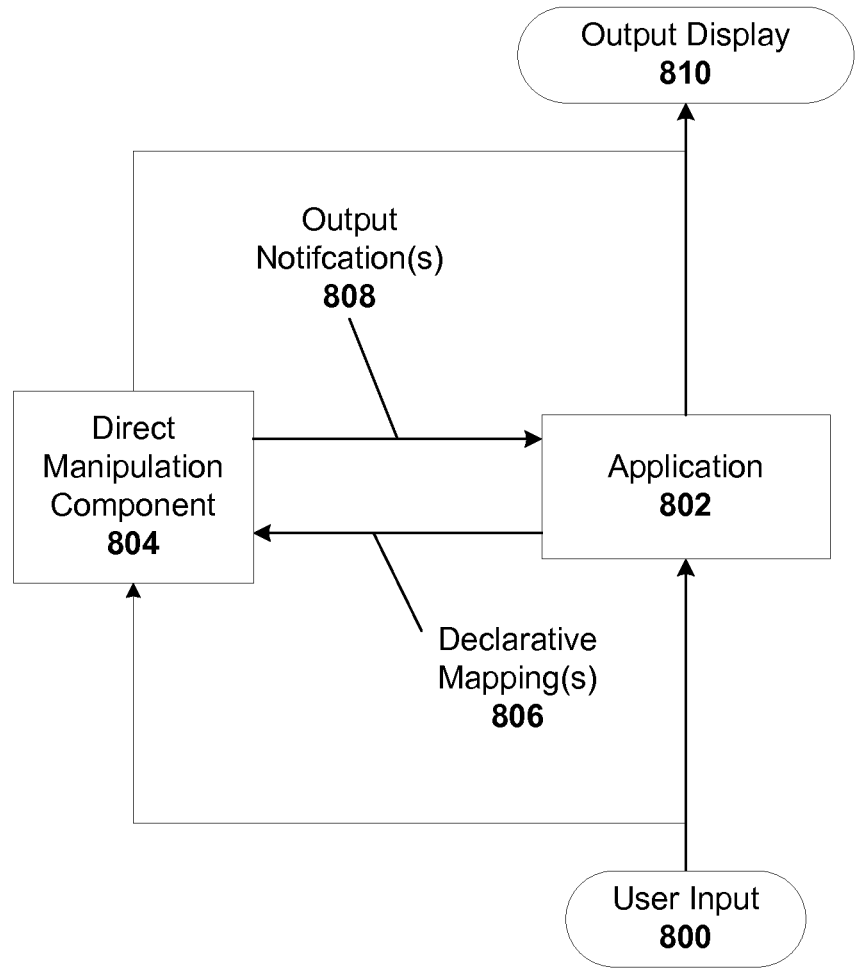
FIG. 8 is a block diagram illustrating an exemplary, non-limiting act of responding to user input on behalf of and in place of an application associated with the user input.

FIG. 8 shows a block diagram illustrating an exemplary, non-limiting act of responding to user input on behalf of and in place of an application associated with the user input. As illustrated in FIG. 8, an application 802 can receive user input 800. In an embodiment, user input 800 can relate to a touch manipulation made by a user on a touch interface. However, it will be appreciated that techniques described herein can be applied to other forms of input, such as keyboard input, mouse input, visual input (e.g., video or camera input), etc.

Application 802 can define one or more declarative mappings 806 which are provided to a direct manipulation component 804. The declarative mappings 806 can be mathematical functions, transforms, graphs, or the like, which relate variables of user input 800 to characteristic or parameters of visual output that responds to user input 800. With the declarative mappings 806 acquired from application 804, direct manipulation component 804 and generate output in response to user input 800. Direct manipulation component 804 can push the generated output to output display 810 to be perceived by the user as a response to user input 800. Direct manipulation component 804 can operate asynchronously and in parallel with application 802. When direct manipulation component 804 automatically responds to user input 800 on behalf of application 802, direct manipulation component 804 sends output notifications 808 to application 802. Output notifications 808 alert application 802 that user input 800 has been directly responded to for application 802. Accordingly, upon receiving output notifications 808, application 802 can update an internal state to reflect any changes due to output generated by direct manipulation component 804.

According to a further embodiment, the conventional rendering path (e.g., from user input 800, through application 802, to output display 810) can be unbounded in time. An amount of time that lapses from user input 800 to output display 810 along the conventional rendering path can be variable and subject to implementation details application 802. For instance, the amount of time that lapses can be around 50 to 500 milliseconds. With the direct manipulation component 804 and declarative mappings 806, the amount of time between receipt of user input 800 to a response on output display 810 can be bounded and/or remain constant irrespective of an implementation of application 802.

Figure 9:
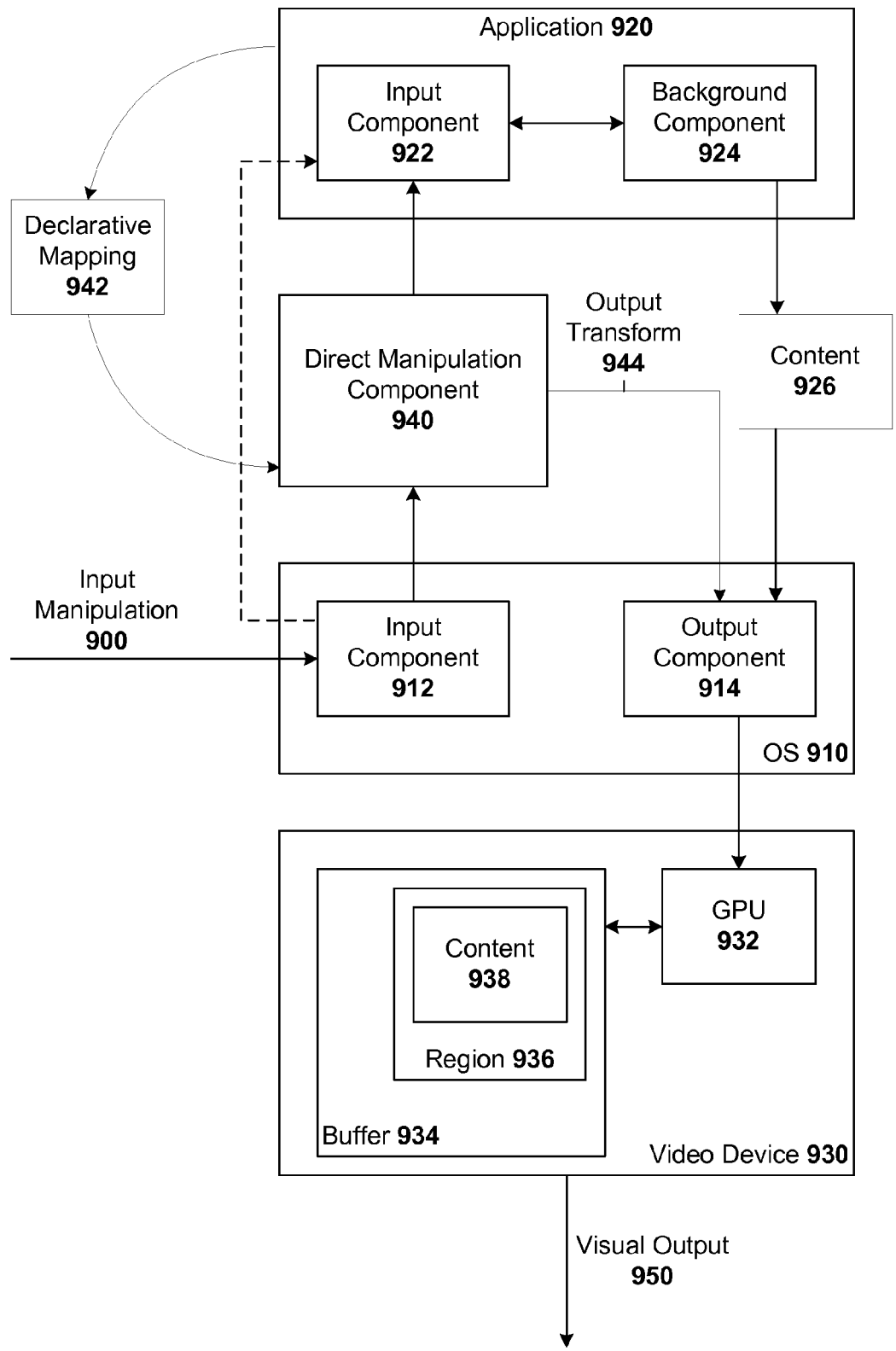
FIG. 9 is a block diagram of an exemplary, non-limiting direct manipulation system in accordance with one or more embodiments.

FIG. 9 illustrates a block diagram of an exemplary, non-limiting direct manipulation system in accordance with one or more embodiments. The direct manipulation system can include an application 920 configured to execute on an operating system (OS) 910 of a computing system. OS 910 can be configured to provide input from a user to application 920 and output information, provided by application 920, to the user. In one example, output information can be visual output information displayed on a display screen. Accordingly, OS 910 can employ a video device 930 configured to render, composite, and transform graphical information. In addition, video device 930 can convert graphical information into electrical signals transmitted to a display apparatus as visual output 950 for display to a user.

According to a specific, non-limiting embodiment, OS 910 can receive an input manipulation 900 from a user. The user can supply input manipulation 900 via gestures performed on touch interface, e.g., touch screen, multi-touch screen, etc. OS 910 can obtain input manipulation 900 via an input component 912, which includes firmware layers, input device drivers, interrupt handling subroutines, or the like, to transform electrical impulses from the touch interface into software messages or data.

Conventionally, input component 912 can forward input manipulation 900 to application 920, or another application on the computer system with input focus. Application 920 can receive input manipulation 900 at input component 922. In one embodiment, input component 922 can be an input thread of application 920 configured to execute an event loop or an input queue. Input component 922 can queue and/or prioritize input manipulation 900 along with other received input and send instructions to background component 924 for additional processing. Background component 924, for example, can include one or more software threads for retrieving information, rendering user interfaces, rendering content of user interfaces, or the like. For instance, background component 924 can generate content 926 which is provided to an output component 914 of OS 910 for output to a user. Output component 914 can include a variety of firmware, video drivers, video graphics libraries and frameworks, etc. configured to communicate with video device 930. Output component 914 can provide content 926 to a graphics processing unit (GPU) 932 configured to perform 3D computer graphics calculations, texture mapping, polygon rendering, geometric calculations and transforms, translations among coordinate systems, anti-aliasing, shading, etc. In one example, GPU 932 can perform 2D acceleration to render buffer 934 (e.g., a framebuffer) which includes a complete frame of data displayable on a display screen. A region 936, within buffer 934, can be associated with application 920. In particular, region 936 can be a portion of memory or a portion of the display screen in which content 926 from application 920 is to be displayed.

According to an embodiment, input manipulation 900 can be handled, e.g., responded to, by a direct manipulation component 940 independently from application 920. Direct manipulation component 940 can receive a declarative mapping 942 from application 920. The declarative mapping 942 can be associated with a type of manipulation (e.g., swipe, tap, pinch, etc.) represented by input manipulation 900. In one non-limiting example, declarative mapping 942 can include a plurality of functions which map a set of parameters of input manipulation 900 to a set of parameters specifying an appropriate output responding to input manipulation 900. Direct manipulation component 940 employ the plurality of functions on input manipulation 900 to obtain a set of parameters specifying output transform 944. Direct manipulation component 940 provides output transform 944 to output component 914, which can instruct GPU 932 to perform output transform 944 on content within buffer 934.

According to a further embodiment, declarative mapping 942 is defined over a region, such as region 936, corresponding to a portion of display or video memory occupied by content from application 920. In this regard, direct manipulation component 940 ignores actual content within the region, leaving that responsibility to application 920. Accordingly, direct manipulation component 940 can generate output transforms on behalf of application 920 on content, while allowing application 920 to alter the content as it sees fit. It is to be appreciated, however, that as new content is generated with the region, direct manipulation component 940 becomes able to instigate transforms on the new content in response to input manipulations.

In yet another embodiment, direct manipulation component 940 can send a notification to application 920 when output transform 944 has been generated on its behalf. In one example, the notification can be handled as input to input component 922. For instance, the notification can specify a particular transform has been performed which indicates that additional or new content is to be retrieved. Thus, input component 922 can instruct background component 924 to retrieve such content and have the retrieved content displayed within the region subject to the transform.

Figure 10:
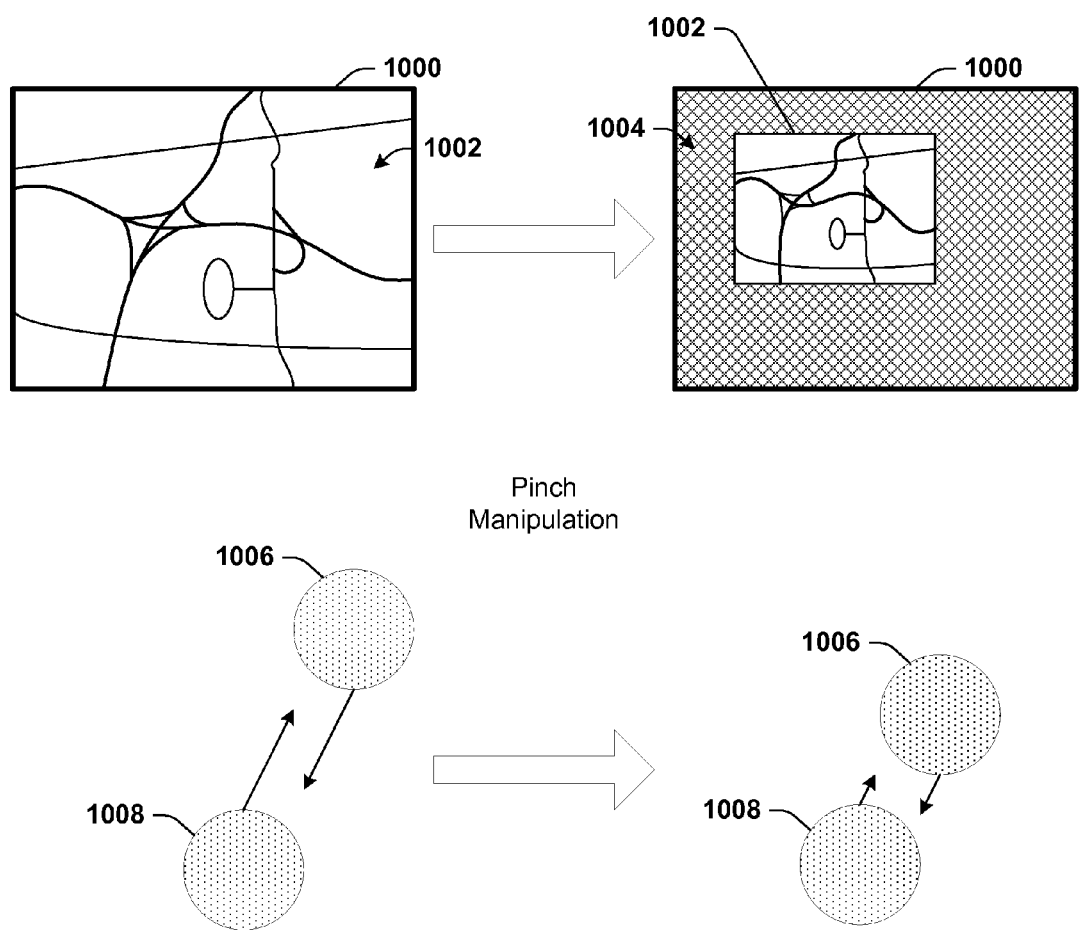
FIG. 10 is an exemplary, non-limiting illustration of an output transform in response to an input manipulation in accordance with one or more embodiments.

FIG. 10 shows an exemplary, non-limiting illustration of an output transform in response to an input manipulation in accordance with one or more embodiments. As shown in FIG. 10, a region 1000 (e.g., of an application, on a display, in memory, etc.) can include a map portion 1002. Region 1000 can be associated with one or more declarative mappings or storyboards are described above. For instance, one such storyboard can describe an output transform in response to a pinch manipulation. As shown in FIG. 10, a pinch manipulation involves a user making at least two points of contact, for instance, contact 1006 and contact 1008. Subsequently, the user bridges a distance between contact 1006 and contact 1008 by sliding fingers together, e.g., pinching, while maintaining the contact points. In response to the pinch manipulation, a scaling or zooming transform can be performed over region 1000. For instance, content, e.g., map portion 1002, is scaled or zoomed in response as shown in FIG. 10. By scaling or zooming map portion 1002, empty space 1004 can become exposed. An application responsible for region 1000 can obtain new content to fill in empty space 1004, wherein the new content, once rendered, becomes subject to the declarative mappings defined over region 1000.

Figure 11:
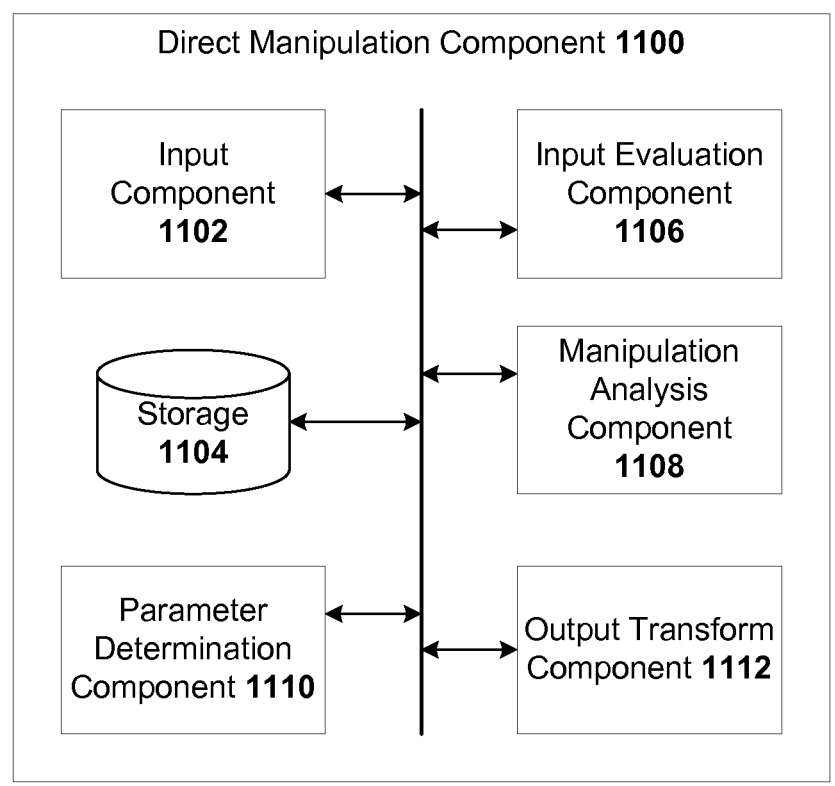
FIG. 11 is a block diagram of an exemplary, non-limiting direct manipulation component in accordance with one or more embodiments.

With reference to FIG. 11, a block diagram is provided that illustrates an exemplary, non-limiting direct manipulation component 1100 in accordance with one or more embodiments. As shown in FIG. 11, direct manipulation component 1100 can include an input component 1102 configured to obtain declarative mappings or storyboards from one or more applications and user input generated from user interaction with input devices such as touch interfaces. Input component 1102 can store received declarative mappings storage 1104.

Input evaluation component 1106 can monitor and sample received user input to identify whether the user input corresponds to a known manipulation. For example, a known manipulation can be an input manipulation for which a declaration mapping associated therewith has been received. If user input corresponds to a manipulation, the manipulation can be analyzed by a manipulation analysis component 1108 configured to identify variables and values associated therewith of the manipulation. A parameter determination component 1110 employs one or more declaration mappings to derive output parameters based upon the identified variables and values. The output parameters can be employed by output transform component 1112 to generate an output transform that responds to the received user input.

Exemplary Networked and Distributed Environments

One of ordinary skill in the art can appreciate that the various embodiments of direct manipulation systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 12:
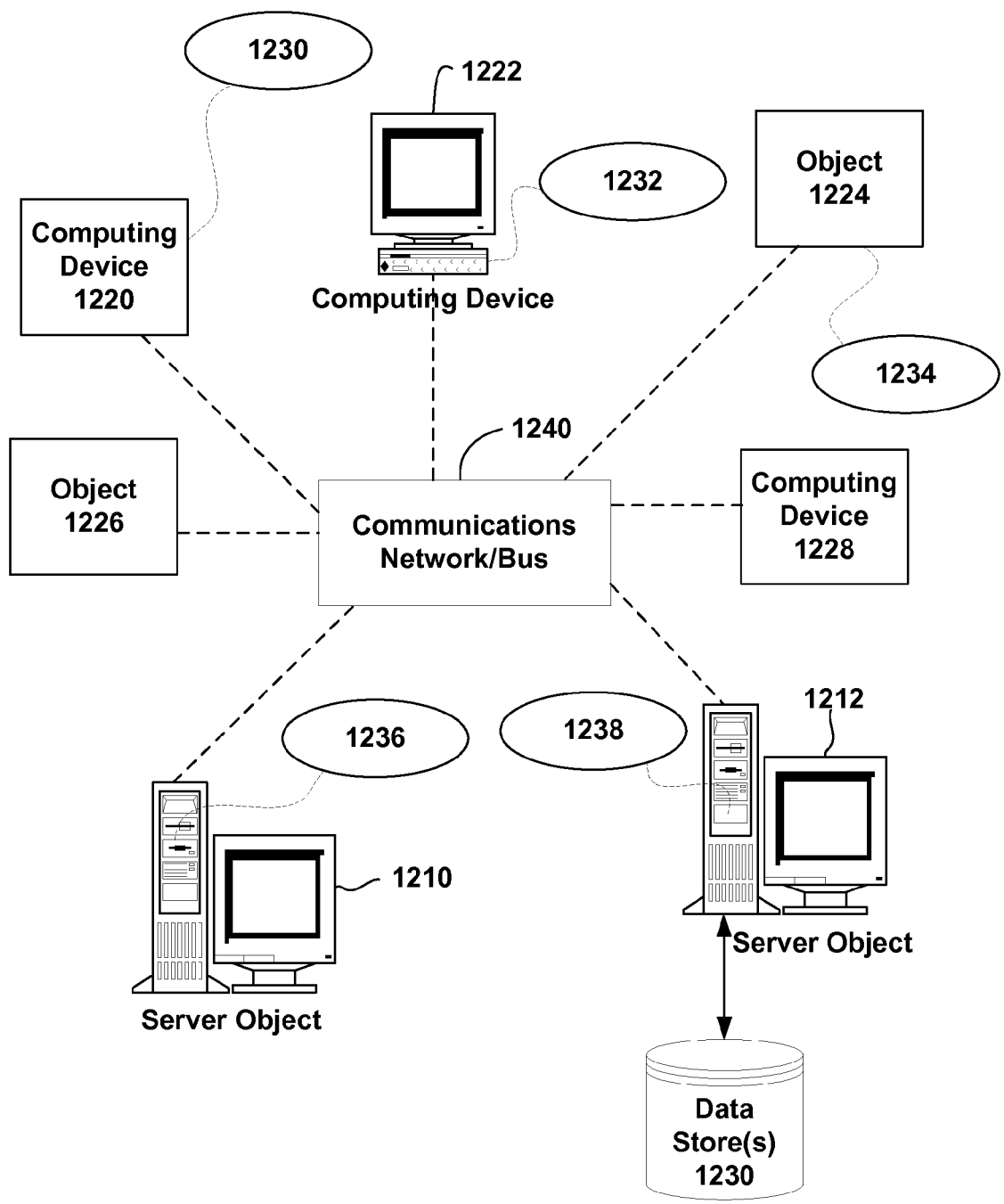
FIG. 12 is a block diagram representing exemplary non-limiting networked environments in which various embodiments described herein can be implemented.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, communications network 1240 may comprise other computing objects and computing devices that provide services to the system of FIG. 12, and/or may represent multiple interconnected networks, which are not shown. Each computing object 1210, 1212, etc. or computing object or device 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the user input processing techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 1240 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Exemplary Computing Device

As mentioned, advantageously, the techniques described herein can be applied to any device where it is desirable to independently handle user input on behalf of applications in a computing system. It can be understood, therefore, that handheld, portable and other computing devices and computing objects of all kinds are contemplated for use in connection with the various embodiments, i.e., anywhere that where user input can be declaratively mapped to output response. Accordingly, the below general purpose remote computer described below in FIG. 13 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
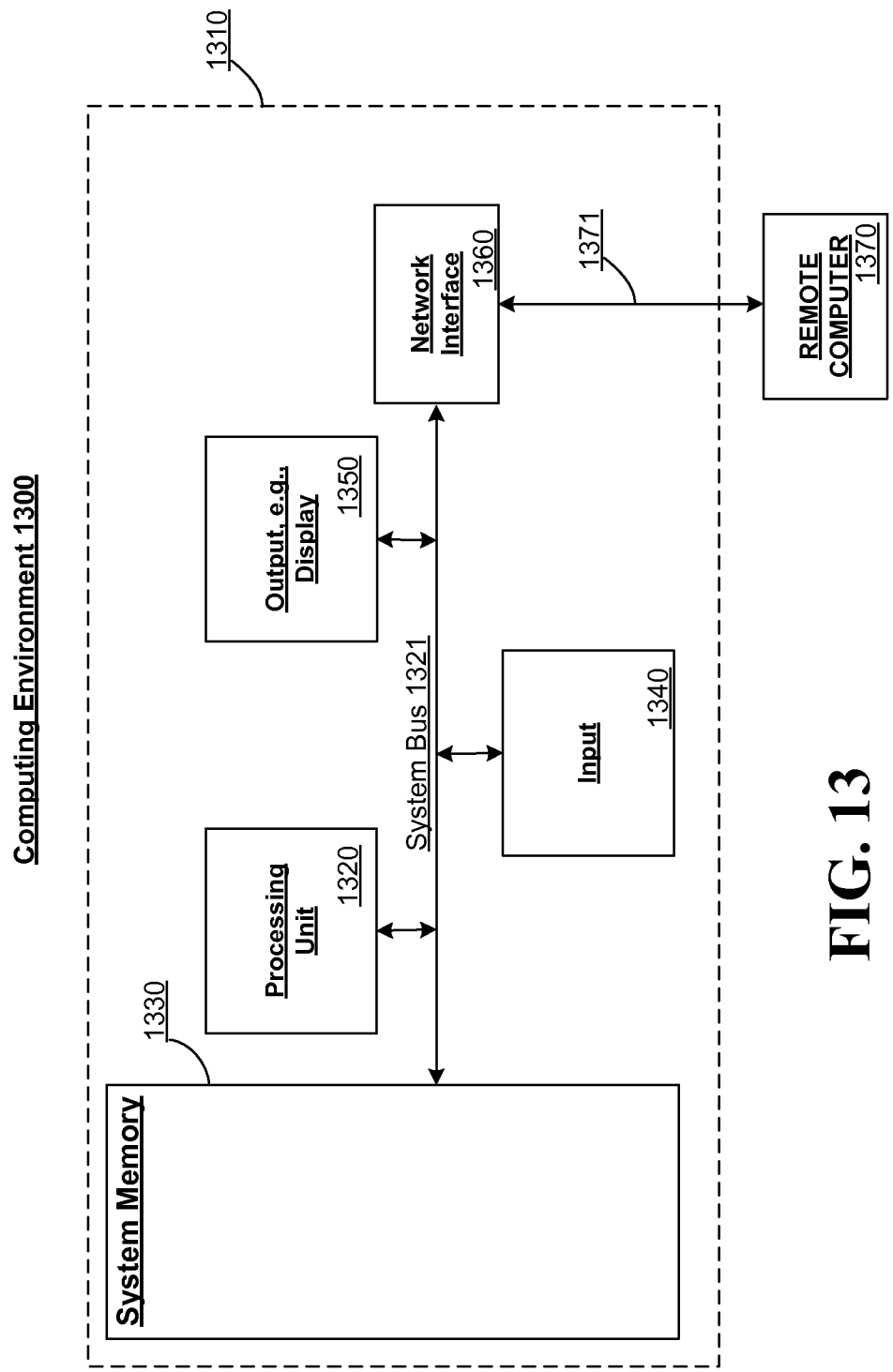
FIG. 13 is a block diagram representing an exemplary non-limiting computing system or operating environment in which one or more aspects of various embodiments described herein can be implemented.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the exemplary computing system environment 1300.

With reference to FIG. 13, an exemplary remote device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method executed by at least one processor of a computing device, comprising:
  executing a direct manipulation component process and an application process on the computing device, including:
    receiving, by the direct manipulation component process executing on the computing device, a declarative mapping from the application process that is also executing on the computing device, wherein the declarative mapping correlates a predefined change to be made in a display output of the computing device to a predefined user input;
    receiving, by the direct manipulation component process, the predefined user input; and
    in response to receiving the predefined user input, making, by the direct manipulation component process, the predefined change to the display output, the predefined change being made by the direct manipulation component process on behalf of the application process without intervention of the application process, wherein:
  the predefined user input is a touch manipulation;
  receiving the predefined user input includes receiving the touch manipulation via a touch interface;
  executing the direct manipulation component process and the application process on the computing device also includes:
    determining whether the received touch manipulation is associated with the declarative mapping; and,
  executing the direct manipulation component process and the application process on the computing device also includes:
    receiving, by the direct manipulation component process, additional user input, the additional user input not being the predefined user input; and
    forwarding the user input to the application process in response to the user input not being the predefined user input.

2. The method of claim 1, wherein executing the direct manipulation component process and the application process on the computing device also includes:
  transmitting the display output to a graphics subsystem configured to present the display output.

3. A method executed by at least one processor of a computing device, comprising:
  executing a direct manipulation component process and an application process on the computing device, including:
    receiving, by the direct manipulation component process executing on the computing device, a declarative mapping from the application process that is also executing on the computing device, wherein the declarative mapping correlates a predefined change to be made in a display output of the computing device to a predefined user input;
    receiving, by the direct manipulation component process, the predefined user input; and
    in response to receiving the predefined user input, making, by the direct manipulation component process, the predefined change to the display output, the predefined change being made by the direct manipulation component process on behalf of the application process without intervention of the application process,
  wherein executing the direct manipulation component process and the application process on the computing device also includes:
    receiving, by the direct manipulation component process, at least one other declarative mapping, each of the at least one other declarative mappings correlating an associated predefined change to be made in the display output of the computing device to an associated predefined user input, the declarative mapping and the at least one other declarative mappings comprising a set of declarative mappings, wherein the set of declarative mappings is associated with a type of touch manipulation;
    receiving, by the direct manipulation component process, additional user input; and
    in response to receiving the additional user input:
      identifying an input manipulation represented by the additional user input; and
      selecting, from the set of declarative mappings, at least one declarative mapping that is associated with the identified input manipulation.

4. The method of claim 3, wherein executing the direct manipulation component process and the application process on the computing device also includes:
  determining a set of values associated with the identified input manipulation based on the additional user input.

5. The method of claim 4, wherein executing the direct manipulation component process and the application process on the computing device also includes:
  determining, based on the at least one declarative mapping, a set of output parameters for the set of values associated with the identified input manipulation.

6. The method of claim 5, wherein executing the direct manipulation component process and the application process on the computing device also includes:
  generating an output transform based on the set of output parameters, including:
    generating a manipulation on at least one of a region or an object of the application process.

7. A computer storage memory having instructions stored therein, the stored instructions being executable by a processor of a computing device to implement a direct manipulation subsystem on the computing device, and being organized into at least:
  an input component on the computing device that is configured to receive:
    at least one declarative mapping from at least one application executing on the computing device; and
    user input corresponding to at least one touch manipulation of a touch interface;
  an output transform component on the computing device that is configured to create at least one output transform, on behalf of the at least one application executing on the computing device and without intervention of the at least one application executing on the computing device, based upon the at least one declarative mapping, wherein the at least one output transform represents at least one response to the user input;
  a manipulation analysis component on the computing device that is configured to identify a set of values associated with the user input; and
  a parameter determination component on the computing device that is configured to derive at least one output parameter of the at least one output transform, and, based on the at least one declarative mapping, obtain a set of output parameters corresponding to the set of values associated with the user input.

8. The computer storage memory of claim 7, wherein the instructions are further organized into:
an input evaluation component on the computing device that is configured to determine that the received user input corresponds to a touch manipulation for which a declarative mapping of the at least one declarative mapping has been received from the at least one application executing on the computing device.

9. A computer storage memory having instructions stored therein, the stored instructions being executable by a processor of a computing device to implement a direct manipulation subsystem on the computing device, and being organized into at least:
an input component on the computing device that is configured to receive:
at least one declarative mapping from at least one application executing on the computing device; and
user input corresponding to at least one touch manipulation of a touch interface; and
an output transform component on the computing device that is configured to create at least one output transform, on behalf of the at least one application executing on the computing device and without intervention of the at least one application executing on the computing device, based upon the at least one declarative mapping, wherein the at least one output transform represents at least one response to the user input, wherein
the at least one declarative mapping defines a plurality of functions that map a set of input parameters of the user input to a set of output parameters specifying an output for a response to the user input.

10. The computer storage memory of claim 9, wherein the output transform component on the computing device is further configured to generate the at least one output transform independently of the application executing on the computing device to which the user input is directed.

11. A computing device, comprising:
a memory and a processor, the memory and the processor respectively configured to store and execute instructions for the computing device, the instructions comprising:
a direct manipulation component configured to execute on the computing device and to receive:
a set of declarative mappings from an application executing on the computing device; and
touch input for the application executing on the computing device from an operating system of the executing on the computing device, wherein:
the direct manipulation component derives output that responds to the touch input, independently and on behalf of the application executing on the computing device, in accordance with the set of declarative mappings, wherein the set of declarative mappings is associated with a type of touch manipulation.

12. The computing device of claim 11, wherein the direct manipulation component is configured to provide the output to the operating system executing on the computing device to instruct a graphics processing unit of the computing device to apply an output transform specified in the output.

13. The computing device of claim 11, wherein the set of declarative mappings includes respective declarative mappings for a set of characteristics of the touch input.

14. A computing device, comprising:
a memory and a processor, the memory and the processor respectively configured to store and execute instructions for the computing device, the instructions comprising:
a direct manipulation component configured to execute on the computing device and to receive:
a set of declarative mappings from an application executing on the computing device; and
touch input for the application executing on the computing device from an operating system of the executing on the computing device, wherein:
the direct manipulation component derives output that responds to the touch input, independently and on behalf of the application executing on the computing device, in accordance with the set of declarative mappings; and
the set of declarative mappings is associated with a region of a display to which the application executing on the computing device renders application content.

15. The computing device of claim 14, wherein the direct manipulation component is configured to apply the output to the application content to the region, and wherein the region is also associated with the set of declarative mappings.

* * * * *